United States Patent
Bowen, III et al.

(10) Patent No.: US 7,141,622 B2
(45) Date of Patent: Nov. 28, 2006

(54) PROCESS FOR PREPARING A SILICA/RUBBER BLEND WHICH INCLUDES DISPERSING SILICA, A SILICA COUPLING AGENT, AND A LOW MOLECULAR WEIGHT END-GROUP FUNCTIONALIZED DIENE RUBBER THROUGHOUT A CEMENT OF A CONVENTIONAL RUBBERY POLYMER, AND SUBSEQUENTLY RECOVERING THE SILICA/RUBBER BLEND FROM AN ORGANIC SOLVENT

(75) Inventors: Daniel Edward Bowen, III, Munroe Falls, OH (US); Thierry Florent Edme Materne, Richfield, OH (US); Sun-Lin Chen, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 181 days.

(21) Appl. No.: 10/630,022

(22) Filed: Jul. 30, 2003

(65) Prior Publication Data
US 2005/0022915 A1 Feb. 3, 2005

(51) Int. Cl.
*C08K 3/34* (2006.01)
(52) U.S. Cl. ...................... 524/492; 524/493
(58) Field of Classification Search ........... 524/261, 524/262, 267, 393, 492, 543, 572, 493; 523/200, 523/202, 212, 216; 152/905, 209.1
See application file for complete search history.

(56) References Cited

U.S. PATENT DOCUMENTS

| | | | |
|---|---|---|---|
| 5,409,969 A * | 4/1995 | Hamada | 523/213 |
| 5,532,319 A * | 7/1996 | Asahara et al. | 525/89 |
| 6,166,108 A * | 12/2000 | Materne et al. | 523/212 |
| 6,359,034 B1 * | 3/2002 | Visel et al. | 523/212 |
| 6,378,582 B1 * | 4/2002 | Sandstrom et al. | 152/209.1 |
| 6,608,145 B1 * | 8/2003 | Lin et al. | 525/332.6 |
| 2003/0069332 A1 * | 4/2003 | Agostini et al. | 523/205 |
| 2003/0105242 A1 * | 6/2003 | Penot | 525/332.6 |
| 2004/0162399 A1 * | 8/2004 | Reddy et al. | 525/479 |

OTHER PUBLICATIONS

Ciullo, Peter A.; Industrial Minerals and Their Uses—A Handbook & Formulary, Noyes Publications, New Jersey, 1996 (pp. 59-60).*

* cited by examiner

*Primary Examiner*—Edward J. Cain
(74) *Attorney, Agent, or Firm*—Alvin T. Rockhill

(57) ABSTRACT

The subject invention reveals a process for preparing a silica/rubber blend which comprises dispersing silica, a silica coupling agent, and a low molecular weight end-group functionalized diene rubber throughout a cement of a conventional rubbery polymer, and subsequently recovering the silica/rubber blend from the organic solvent. It further reveals a tire having a tread that is made from such a silica/rubber blend.

17 Claims, No Drawings

US 7,141,622 B2

PROCESS FOR PREPARING A SILICA/RUBBER BLEND WHICH INCLUDES DISPERSING SILICA, ASILICA COUPLING AGENT, AND A LOW MOLECULAR WEIGHT END-GROUP FUNCTIONALIZED DIENE RUBBER THROUGHOUT A CEMENT OF A CONVENTIONAL RUBBERY POLYMER, AND SUBSEQUENTLY RECOVERING THE SILICA/RUBBER BLEND FROM AN ORGANIC SOLVENT

BACKGROUND OF THE INVENTION

In recent years, a considerable interest in silica reinforced rubber articles, such as tires, has developed. For instance, U.S. Pat. No. 5,227,425 indicates that tires made with tread formulations that contain silica exhibit a number of important performance advantages over tires manufacture using carbon black as the filler. The utilization of silica in tire tread formulations is believed to (a) lower rolling resistance, (b) provide better traction on snow, and (c) lower noise generation, when compared with conventional tires filled with carbon black.

U.S. Pat. No. 5,227,425 discloses a sulfur-vulcanizable rubber composition obtained by thermomechanical work of a conjugated diene compound and an aromatic vinyl compound prepared by solution polymerization in a hydrocarbon solvent having a total content of aromatic vinyl compound of between 5% and 50% and a glass transition temperature (Tg) of between 0° and −80° C. with 30 to 150 parts by weight per 100 parts by weight of elastomer of a silica having a BET surface area of between 100 and 250 $m^2/g$, a CTAB surface area of between 100 and 250 $m^2/g$, an oil absorption measured in DBP of between 150 and 250 ml/100 g, and an average projected area of the aggregates greater than 8500 $nm^2$ before use and between 7000 and 8400 $nm^2$ after thermomechanical mixing as well as the additives conventionally employed, with the exception of the sulfur vulcanization system, comprising at least one heat step reaching a temperature of between 130° C. and 180° C. for a suitable period of tune of between 10 seconds and 20 minutes which is a function of the temperature selected in order to carry out the mechanical work and of the nature and volume of the components subjected to the mechanical work, followed by a finishing step consisting of the incorporating of the vulcanization system by mechanical work at a temperature below the vulcanization temperature.

Sometimes rubber for tires is supplied by a rubber producer to a tire manufacturer in the form of a masterbatch containing an elastomer, an oil extender, and a filler. The traditional filler has been carbon black in the form of fine particles. These particles have hydrophobic surface characteristics and will therefore disperse easily within the hydrophobic elastomer. In contrast, silica has a very hydrophilic surface and considerable difficulty has been encountered in dispersing silica in the hydrophobic rubbery elastomer.

A number of techniques have been developed to incorporate such reinforcing agents and fillers into the polymer compositions, including both wet and dry blending processes. The incorporation of silica and carbon black as reinforcing agents and/or fillers into rubbery elastomers is far more complex than one might initially believe. One problem in wet blending of silica with latices of such polymers arises from the fact that the hydrophilic silica has a tendency to associate with the aqueous phase and not blend uniformly with the hydrophobic polymer.

To overcome the problems associated with the hydrophilic nature of the silica, U.S. Pat. No. 3,317,458 proposed a process whereby an aqueous solution of silicic acid was treated so as to precipitate silica directly onto the surface of an aqueous carbon black in paste form. One significant limitation of this technique is that the surface of the carbon black is altered thus obviating the utility of the many surface structure characteristics of specialty carbon blacks available to the skilled compounder in designing filled, reinforced polymers for specific end uses.

Attempts have been made to use cationic emulsifiers in an effort to distribute such fillers and/or reinforcing agents in polymeric latices; notably among them are quaternary alkylated ammonium halides (see German Patent No. 1,188,797). It has been found, however, that such quaternary ammonium compounds have a tendency to react with the carbon black, dispersing it into the aqueous phase; that limiting the ability to blend carbon black with the polymeric components in the latex. In U.S. Pat. No. 3,686,113 aqueously wet silica is treated with oleophilic quaternary ammonium compounds to blend with an aqueous dispersion of an elastomer containing an anionic dispersing agent. In addition to the problem referenced above with carbon black dispersion, unfortunately, such techniques require specific coagulating agents.

Perhaps the most commonly employed practice, used commercially, is the technique of dry blending either silica, carbon black or both of them into rubber and thermoplastic polymers in a high-shear milling operation. That practice has many limitations. Notable among them include the tendency of the filler particles to agglomerate to each other, resulting in nonuniform dispersion of the filler throughout the polymer constituting the continuous phase. Another problem commonly experienced in such high-shear milling operations is the tendency of the polymers to degrade during milling. That necessitates the use of higher molecular weight polymers, which sometimes require the incorporation of various types of processing aids to facilitate mixing and dispersion of the filler particles into the polymer constituting the continuous phase. The cost associated with the use of such processing aids also increases the manufacturing cost of the polymeric compound or article and can lead to diminished product performance. The use of processing aids has the further disadvantage in that such processing aids may have a negative effect on the cure or end use of the polymer. Such dry blending techniques also result in additional processing costs, in part due to excessive equipment wear caused by the abrasive fillers.

To improve dispersion of the silica during dry mixing, it has been proposed that such compounding operations employ a silica which has been treated with an organosilane coupling agent having dual functionality. Representative of such coupling agents are those well known compounds that include both an organic groups, such as an amino alkyl group, a mercaptoalkyl group, or a polysulfidic-bis-organo alkoxy silane group bonded directly to the silicon atom along with a readily hydrolyzable group, such as an alkoxy group as represented by a methoxy group or an ethoxy group, likewise bonded directly to the silicon atom. In those systems, it is generally recognized that the alkoxy group hydrolyzes in the presence of moisture typically found on the surface of the silica to form the corresponding silanol which reacts with or condenses in the presence of the silica surface to bond the silicon atom to the silica surface. The organic groups likewise attached to the silicon atom are thus available for chemical reaction with the polymer matrix during vulcanization. As a result, the polymer matrix may become chemically bonded by means of the coupling agent to the silica surface during cure or vulcanization of the polymer. Problems associated with the use of such silanes during compounding are unpleasant odors, premature curing, and/or scorching.

In an effort to overcome the problems associated with the use of silane coupling agents, it has been proposed in U.S. Pat. No. 5,405,897 to employ phenoxy acidic acid along with a methylene donor in place of the conventional organosilanes. The foregoing patent suggests that the use of such a system provides improved physical properties and reduced viscosity of the melt during compounding.

Various other attempts have been made to overcome the problems associated with wet blending such fillers and/or reinforcing agents with polymer latices. For example, it has been proposed, as described in U.S. Pat. No. 3,055,956 and U.S. Pat. No. 3,767,605 to add carbon black in the form of a slurry directly to an emulsion polymerization process of rubbery polymer, at the latex stage, followed by coagulation and recovery of a rubber-carbon black masterbatch. Such processes work well with carbon black, but fail to incorporate substantial amounts of fine particulate silica. U.S. Pat. No. 4,481,329 proposes a process for dispersing carbon black and like fillers into concentrated rubber latices by the use of a low molecular weight conjugated diene/carboxylic acid polymer in the form of an alkali metal salt dissolved in water as the dispersing aid or dispersing latex.

U.S. Pat. No. 4,482,657 describes mixtures of silica and synthetic polymers prepared by treating a polymer latex with a dispersion of silica and an alkyl trimethyl ammonium halide in water. Not only does the quaternary ammonium halide disrupt the blending of carbon black, the process requires the slow addition of the silica dispersion to prevent premature coagulation. Other elaborate techniques as described in U.S. Pat. No. 3,907,734 where a partitioning agent in the form of a blend of precipitated silica and hydrophobic fumed silica are incorporated into a concentrated polymer latex have been suggested. The silica adsorbs the water, and the resulting solid mixture is dried with removal of the hydrophobic fumed silica to form a free flowing blend of polymer particles coated with precipitated silica. That process is limited to relatively small scale batch system and requires recovery and recycle of the hydrophobic fumed silica. That process fails to incorporate into the polymer the more desirable hydrophobic fumed silica.

Such processes with concentrated latex, as those skilled in the art can readily appreciate, involve complex procedures not only blending the silica with the polymer latex, but also in effecting its recovery when excess silica or carbon black must be employed. Another limitation of such processes is that recovery of the filled polymer directly from the latex stage without filtration and like treatment steps used to remove byproducts from the emulsion polymerization can have deleterious effects on the end use properties of the polymer thus recovered. Such problems can be seen in French Patent 2,558,008 and French Patent 2,558,874. In the first, the addition to a rubber latex of precipitated silica effects coagulation of the rubber polymer. In the second, a stable latex of derivatized silica and a carboxylated butadiene rubber is prepared to add to natural or synthetic elastomer latices. The derivatization of the silica is accomplished by treatment with polyamines, polyethylene amines or nonionic polyoxyethylene. Such free agents are wholly incompatible with typical coagulation techniques used in the recovery of the emulsion process polymers.

SUMMARY OF THE INVENTION

The present invention relates to a technique to efficiently and effectively disperse silica throughout a rubbery polymer. By utilizing this technique mechanical mixing procedures that are energy intensive and require large capital investments in mixing equipment can be significantly reduced. By reducing the amount of shearing forces to which the rubber is subjected polymer degradation is also significantly reduced. The utilization of the technique of this invention also results in a uniform blend of the silica throughout the rubber and consequently better interaction between the silica and the rubber. This results in better physical properties, such as higher modulus.

The subject invention more specifically discloses a process for preparing a silica/rubber blend which comprises dispersing silica, a silica coupling agent, and a low molecular weight end-group functionalized diene rubber throughout a cement of a conventional rubbery polymer, and subsequently recovering the silica/rubber blend from the organic solvent.

The present invention further reveals a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of the silica/rubber blend made by dispersing silica, a silica coupling agent, and a low molecular weight end-group functionalized diene rubber throughout a cement of a conventional rubbery polymer, and subsequently recovering the silica/rubber blend from the organic solvent.

DETAILED DESCRIPTION OF THE INVENTION

The technique of this invention can be used to incorporate silica into virtually any type of rubbery polymer (elastomer). For instance, the rubbery polymer can be natural rubber, synthetic polyisoprene rubber, polybutadiene rubber, isoprene-butadiene rubber (IBR), styrene butadiene rubber (SBR), styrene-isoprene rubber (SIR), styrene-isoprene-butadiene rubber (SIBR), or some other type of conventional polydiene rubber.

In practicing the present invention, the silica, a silica coupling agent, and a low molecular weight end-group functionalized diene rubber is dispersed throughout the cement of the rubbery polymer. After the silica, the silica coupling agent, and the low molecular weight end-group functionalized diene rubber have been well dispersed throughout the cement of the conventional rubber, the silica/rubber blend is recovered from the organic solvent employed in making the cement.

The conventional rubbery polymer used in the blend will typically be a synthetic rubber made by solution polymerization in the organic solvent. In such cases, the cement of the rubbery polymer will be used in the process of this invention without previously being recovering from the organic solvent in which it was synthesized. On the other hand, if the conventional rubber is natural rubber or a synthetic rubber made by emulsion polymerization then it will be necessary to dissolve the rubbery polymer in an organic solvent to make a cement of it in the organic solvent.

The organic solvent will typically be a liquid hydrocarbon that can be one or more aromatic, paraffinic or cycloparaffinic compounds. These solvents will normally contain from 4 to 10 carbon atoms per molecule and will be liquid at room temperature. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha and the like, alone or in admixture. Cyclohexane and mixtures of various hexane isomers are typically preferred for utilization as the organic solvent.

The cement of the rubbery polymer will normally contain from about 5 weight percent to about 30 weight percent polymer and from about 70 weight percent to about 95 weight percent of the organic solvent. In most cases, it will be preferred for the rubber cement to contain from 10 weight percent to 25 weight percent of the rubbery polymer. It is generally more preferred for the rubber cement to contain 15 weight percent to 20 weight percent of the elastomer.

In the first step of the process of this invention, a silica, a silica coupling agent, and a low molecular weight end-group functionalized diene rubber are dispersed throughout the cement of the conventional rubbery polymer. This is typically done by making a slurry of the silica in an organic solvent and subsequently adding the low molecular weight end group functionalized polydiene rubber thereto followed by the addition of silica coupling agent to the slurry. The slurry containing the silica, the low molecular weight end group functionalized diene rubber, and the silica coupling agent is ten added to the cement of the conventional rubbery polymer and the resulting solution is mixing. Normally, agitation will be provided to mix the various components together to attain an essentially homogeneous solution.

The silica will typically be added to the cement of the conventional rubber as a slurry in an organic solvent that also contains the silica coupling agent and the low molecular weight end group functionalized diene rubber. The organic solvent will typically be the same solvent as is employed in the cement of the conventional rubbery polymer. The silica utilized can include pyrogenic and precipitated siliceous pigments, although precipitate silicas are preferred. The siliceous pigments preferably employed in this invention are precipitated silicas such as, for example, those obtained by the acidification of a soluble silicate, e.g., sodium silicate. As a general rule, the silica will have an average particle size that is within the range of about 4 nm to 120 nm, and will preferably have a particle size that is within the range of 7 nm to 60 nm. The silica is typically ground to attain the desired small particle size.

Such silicas might be characterized, for example, by having a BET surface area, as measured using nitrogen gas, preferably in the range of about 40 to about 600, and more usually in a range of about 50 to about 300 square meters per gram. The silica will preferably have a BET surface area that is within the range of about 125 m²/g to about 200 m²/g. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in the practice of this invention. Some representative examples of silica that can be used in the practice of this invention includes, but is not limited to, silicas commercially available from PPG Industries under the Hi-Sil trademark, such as Hi-Sil® 210 and Hi-Sil® 243, silicas available from Rhone-Poulenc, with, for example, designations of Z1165MP and Z165GR and silicas available from Degussa AG with, for example, designations VN2, VN3, and BV9000GR. Zeopol® 8745 silica from J. M. Huber Corporation, reportedly having an average total of about 13 hydroxyl groups per square nanometer of silica surface area and a ratio of geminal hydroxyl groups to said average total of about 0.23/1; a CTAB value of about 145 m²/g and a BET value of about 185 m²/g can also be used in the practice of this invention. Zeopol® 8715 silica from J. M Huber Corporation reportedly characterized by having an average total of about 18 hydroxyl groups per square nanometer surface of said silica and a ratio of geminal hydroxyl groups to said average total of about 0.27/1, a CTAB value of about 94 m²/g and a BET value of about 163 m²/g is another example of a silica that can be used in the practice of this invention.

The silica coupling agent will typically be a compound of the formula:

Z-Alk-S$_n$-Alk-Z (I)

Z-Alk-Sn-Alk (II)

Z-Alk-SH (III)

Z-Alk (IV)

Si(OR$^1$)$_4$ (V)

in which Z is selected from the group consisting of

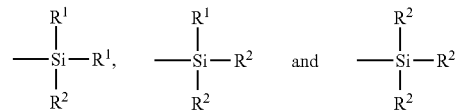

where R$^1$ is an alkyl group of 1 to 4 carbon atoms, cyclohexyl or phenyl; wherein R$^2$ is alkoxy of 1 to 8 carbon atoms or cycloalkoxy of 5 to 8 carbon atoms; and wherein Alk is a divalent hydrocarbon of 1 to 18 carbon atoms and n is an integer of 2 to 8. It should be noted that such compounds can be used alone or in combination.

Specific examples of sulfur-containing organosilicon compounds which may be used in accordance with the present invention include: 3,3'-bis(trimethoxysilylpropyl) disulfide, 3,3'-bis(triethoxysilylpropyl)tetrasulfide, 3,3'-bis (triethoxysilylpropyl) octasulfide, 3,3'-bis(trimethoxysilylpropyl)tetrasulfide, 2,2'-bis(triethoxysilylethyl) tetrasulfide, 3,3'-bis(trimethoxysilylpropyl)trisulfide, 3,3'-bis(triethoxysilyipropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl) disulfide, 2,2'-bis(methoxy diethoxy silyl ethyl)tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl)trisulfide, 2,2'-bis(tri-2"-methylcyclohexoxysilylethyl)tetrasulfide, bis (trimethoxysilylmethyl)tetrasulfide, 3-methoxyethoxy propoxysilyl 3'-diethoxybutoxy-silylpropyltetrasulfide, 2,2'- bis(dimethylmethoxysilylethyl) disulfide, 2,2'-bis(dimethylsec.butoxysilylethyl) trisulfide, 3,3'-bis(methylbutylethoxysilylpropyl)tetrasulfide, 3,3'-bis(di t-butylmethoxysilylpropyl) tetrasulfide, 2,2'-bis(phenylmethyl methoxysilylethyl) trisulfide, 3,3'-bis(diphenyl isopropoxysilylpropyl)tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec.butoxysilylpropyl) disulfide, 3,3'-bis(propyldiethoxysilylpropyl) disulfide, 3,3'-bis(butyldimethoxysilylpropyl)trisulfide, 3,3'-bis(phenyldimethoxysilylpropyl)tetrasulfide, 3-phenylethoxybutoxysilyl 3'-trimethoxysilylpropyl tetrasulfide, 4,4'-bis (trimethoxysilylbutyl)tetrasulfide, 6,6'-bis (triethoxysilylhexyl)tetrasulfide, 12,12'-bis (triisopropoxysilyl dodecyl) disulfide, 18,18'-bis (trimethoxysilyloctadecyl)tetrasulfide, 18,18'-bis (tripropoxysilyloctadecenyl) tetrasulfide, 4,4'-bis (trimethoxysilyl-buten-2-yl)tetrasulfide, 4,4'-bis (trimethoxysilylcyclohexylene)tetrasulfide, 5,5'-bis (dimethoxymethylsilylpentyl) trisulfide, 3,3'-bis (trimethoxysilyl-2-methylpropyl)tetrasulfide and 3,3'-bis (dimethoxyphenylsilyl-2-methylpropyl) disulfide.

The preferred sulfur-containing organosilicon compounds are the 3,3'-bis(trimethoxy or triethoxy silylpropyl) sulfides. The most preferred compound is 3,3'-bis(triethoxysilylpropyl)tetrasulfide. Therefore, as to Formula I, preferably Z is

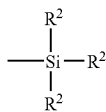

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The low molecular weight end-group functionalized diene rubber will typically have a weight average molecular weight which is within the range of about 50,000 to about 200,000 and will more typically have a weight average molecular weight which is within the range of about 65,000 to about 150,000. The low molecular weight end-group functionalized diene rubber will preferably have a weight average molecular weight which is within the range of about 75,000 to about 125,000. The low molecular weight end-group functionalized diene rubber will normally be comprised of repeat units that are derived at least one conjugated diolefin monomer and optionally additional monomers that are copolymerizable therewith.

The diolefin monomers that can be utilized in the preparation of the low molecular weight end-group functionalized diene rubber normally contain from 4 to 12 carbon atoms with those containing from 4 to 8 carbon atoms being more commonly utilized. The diolefin monomers used in such polymers are normally conjugated diolefins. The conjugated diolefin monomers which are utilized in the synthesis of such polymers generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the liked alone or in admixture.

Feed stocks which are comprised of one or more conjugated diolefin monomers in admixture with other low molecular weight hydrocarbons can be utilized. Such admixtures, termed low concentration diene streams, are obtainable from a variety of refinery product streams, such as naptha-cracking operations or can be intentionally blended compositions. Some typical examples of low molecular weight hydrocarbons which can be admixed with diolefin monomers, such as 1,3-butadiene, in the polymerization feed include propane, propylene, isobutane, n-butane, 1-butene, isobutylene, trans-2-butene, cis-2-butene, vinylacetylene, cyclohexane, ethylene, propylene, and the like.

Low molecular weight end-group functionalized rubbers that are copolymers or terpolymers of one or more diolefin monomers with one or more other ethylenically unsaturated monomers which are copolymerizable with diolefin monomers can also empoyled. Some representative examples of ethylenically unsaturated monomers that can potentially be synthesized into such low molecular weight end-group functionalized polymers include alkyl acrylates, such as methyl acrylate, ethyl acrylate, butyl acrylate, methyl methacrylate and the like; vinylidene monomers having one or more terminal $CH_2$—CH- groups; vinyl aromatics such as styrene, α-methylstyrene, bromostyrene, chlorostyrene, fluorostyrene and the like; α-olefins such as ethylene, propylene, 1-butene, and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene, and the like; vinyl esters, such as vinyl acetate; α-,β-olefinically unsaturated nitriles, such as acrylonitrile and methacrylonitrile; α-,β-olefinically unsaturated amides, such as acrylamide, N-methyl acrylamide, N,N-dimethylacrylamide, methacrylamide, and the like.

Low molecular weight end-group functionalized diene rubbers that are copolymers of one or more diene monomers with one or more other ethylenically unsaturated monomers will normally contain from about 50 weight percent to about 99 weight percent diene monomers and from about 1 weight percent to about 50 weight percent of the other ethylenically unsaturated monomers in addition to the diene monomers. For example, copolymers of diene monomers with vinylaromatic monomers, such as styrene-butadiene rubber (SBR) which contain from 50 to 95 weight percent diene monomers and from 5 to 50 weight percent vinylaromatic monomers are useful in in the practice of this invention.

Vinyl aromatic monomers are probably the most important group of ethylenically unsaturated monomers which are commonly incorporated into such low molecular weight end-group functionalized diene rubbers. Such vinyl aromatic monomers are, of course, selected so as to be copolymerizable with the diolefin monomers being utilized. Generally, any vinyl aromatic monomer which is known to polymerize with anionic initiators, such as organolithium compounds, or Zeigler-Natta catalysts can be used. Such vinyl aromatic monomers typically contain from 8 to 20 carbon atoms. Usually the vinyl aromatic monomer will contain from 8 to 14 carbon atoms. The most widely used vinyl aromatic monomer is styrene. Some examples of vinyl aromatic monomers that can be utilized include 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and the like.

The relative amount of conjugated diolefin monomers and monovinyl aromatic compound employed can vary over a wide range. In preparing low molecular weight end-group functionalized rubbers, the proportion of the conjugated diolefin monomers versus the monovinyl-substituted aromatic monomers will typically be sufficient so as to result in a substantially rubbery or elastomeric copolymer product. There is no sharp break point as to the amount of conjugated diene versus monovinyl-substituted aromatic compound that confers rubbery or elastomeric properties on the resulting copolymer, though in general at least 50 parts by weight of conjugated diene are required on an exemplary basis. Thus, for a rubbery copolymer, as is preferred in accordance with this invention, the weight ratio of conjugated diene to monovinyl aromatic compound in the monomer charge would be in the range of about 50:50 to 95:5. Of course, mixtures of conjugated dienes as well as mixtures of monovinyl-substituted aromatic compounds can be utilized.

The low molecular weight end-group functionalized diene rubber will typically be functionalized with an alkoxy silane, an amine group, an epoxy group, or a carboxyl group. A wide variety of alkoxy silanes can be used to functionalize the low molecular weight rubber. For instance, tetramethoxysilane (TMOS) which is of the formula: $Si(OCH_3)_4$, tetraethoxysilane (TEOS), which is of the formula: $Si(CH_2CH_3)_4$, tetrapropoxysilane, or tetrabutoxysilane can be utilized to functionalize the low molecular weight rubbery polymer. The low molecular weight rubbery polymer can be functionalized with amine groups, epoxy groups, or carboxyl groups by utilizing one of the procedures described by Henry L Hsieh and Roderic P. Quirk, *Anionic Polymerization Principles and Practical Applications*, Chapter 11, pages 261–306, (Marcel Dekker, Inc., 1996), the teaching of which are incorporated herein by reference in their entirety.

The amount of silica incorporated into the rubber will vary with the application in which the polymer is being used. However, the silica will typically be incorporated at a level within the range of about 40 phr to about 200 phr (parts by weight per 100 parts by weight of the rubber). In most cases the silica will be incorporated into the rubbery polymer at a level which is within the range of about 50 phr to about 150 phr.

In making the silica/rubber blends of this invention the low molecular weight end-group functionalized diene rubber will typically be added to the cement of the conventional rubbery polymer in an amount which is within the range of about 4 phr to about 20 phr. The low molecular weight end-group functionalized diene rubber will more typically be incorporated into the cement of the conventional rubber in an amount which is within the range of about 5 phr to about 15 phr. The low molecular weight end-group functionalized diene rubber will preferably be incorporated into the cement of the conventional rubber in an amount which is within the range of about 6 phr to about 10 phr.

The silica coupling agent will typically be added to the cement of the conventional rubbery polymer at a level which is within the range of about 2 phr to about 20 phr. The silica coupling agent will more typically be added to the cement of the conventional rubbery polymer at a level which is within the range of about 3 phr to about 15 phr. The silica coupling agent will preferably be added to the cement of the conventional rubbery polymer at a level which is within the range of about 4 phr to about 8 phr.

An extending oil can also optionally be added to the cement of the rubbery polymer. Such extending oils will typically be added at a level which is within the range of 0 phr to 50 phr. In the case of oil extended rubbers the oil will more typically be added in an amount which is within the range of 20 phr to 45 phr, and will most typically be added at a level which is within the range of 25 phr to 35 phr.

The silica, silica coupling agent, and the low molecular weight polydiene rubber will typically be dispersed into the cement of the conventional rubber at a temperature which is within the range of about 25° C. to about 170° C. These components will more typically be dispersed into the rubber cement at a temperature which is within the range of 40° C. to about 150° C., and will preferably be dispersed into the polymer cement at a temperature which is within the range of 50° C. to 130° C. It is normally advantageous in commercial applications for this to be done at a temperature which is within the range of about 60° C. to about 90° C.

After the silica, silica coupling agent, and the low molecular weight polydiene rubber have been dispersed throughout the cement of the rubbery polymer the silica/rubber blend is recovered from the organic solvent. This can be accomplished by using a variety of techniques. One such procedure comprises mixing the rubber cement with a polar coagulating agent, such as methanol, ethanol, isopropyl-alcohol, acetone, or the like. The coagulating agent can be added at room temperature or below whereupon the liquified low molecular weight hydrocarbons will vaporize. If desired, gentle heat may be applied to hasten the removal of low molecular weight hydrocarbons, but not sufficient heat to vaporize the polar coagulating agent. The vaporized low molecular weight hydrocarbon solvents can then be recovered and recycled. The coagulated silica/rubber blend is recovered from the slurry of the polar coagulating agent by centrifugation, decantation, or filtration.

Another procedure for recovering the silica/rubber blend is by subjecting the rubber cement (solution) to spray-drying. Such a procedure is particularly suitable for continuous operations and has the advantage that heat requirements are minimized. When such a procedure is used, the recovered polymer should be washed soon after recovery with a polar solvent in order to destroy the remaining active catalyst contained in the polymer. In such procedures, the vaporized organic solvents are also easily recovered but will normally require purification before being recycled.

In commercial operations, steam stripping techniques will typically be empolyed to recover the silica/rubber from the polymer cement. In such steam stripping procedures solvent and residual monomer will typically be recycled. After steam stripping, the cis-1,4-polyisoprene rubber crumb will normally be dried in an extruder-drier at an elevated temperature.

The silica/rubber blend will typically be used as a masterbatch and accordingly will subsequently be blended with additional polymers and rubber chemicals. This can be accomplished by using an expander/expeller, a twin-screw extruder, a continuous mixer, or the like.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

In this experiment a silica/rubber blend was made utilizing the technique of this invention and compared to a silica/rubber blend made by a convention dry mixing technique. In the procedure used a silica slurry was made by mixing silica powder, a silica coupling agent, and a low molecular weight TEOS functionalized polybutadiene rubber into hexane at 60° C. for 2 hours. The TEOS functionalized polybutadiene rubber had a number average molecular weight of between 105,000 and 165,000. It also had a glass transition temperature of about −19° C. to −25° C.

The silica slurry containing the silica coupling agent and the low molecular weight end-group functionalized rubber was then mixed into a cement of Solflex® 2535 styrene-butadiene rubber having a solids content of 15 percent at 60° C. for 2 hours. The rubber cement was subsequently steam stripped to recover the silica/rubber blend from the hexane solvent. The silica/rubber blend recovered had a particle size of 30–150 mesh and was dried at 60° C. for 14 to 18 hours. There was not any detectable silica coupling agent in the hexane or water that was recovered.

The silica/rubber sample was then compounded with about 2 phr of sulfur, 3 phr of stearic acid, 2.5 phr of zinc oxide, an accelerator, and an antioxidant and cured. A blend of silica and the rubber made by mixing the silica and silica coupling agent into the dry rubber was also compounded and cured using the same formulation and curing conditions for comparative purposes (as a control). The physical properties of the experimental sample and the control are shown in Table I.

TABLE I

| Property | Solution Blend | Control | Improvement |
| --- | --- | --- | --- |
| Tan δ | 0.101 | 0.102 | 0.5% |
| G'50%/G'1% | 0.48 | 0.43 | 12% |
| Tensile (mPa) | 22.7 | 20.3 | 12% |
| Elongation | 440% | 403% | 9% |
| M300%/M100% | 5.3 | 4.5 | 18% |
| Power (mKg-m) | 12.6 | 14.2 | 11% |

As can be seen the silica/rubber blend made utilizing the technique of this invention (solution blend) exhibited significantly better modulus and tensile strength than did the control. It also required less power consumption to formulate in the mixing procedure used.

EXAMPLE 2

The procedure employed in Example 1 was repeated in this experiment except that a low molecular weight TEOS functionalized polybutadiene rubber having a molecular weight within the range of 95,000 to 170,000 and a glass transition temperature of −95° C. was used instead of the low molecular weight end-group functionalized styrene-butadiene rubber employed in Example 1. The silica/rubber sample was then compounded and compared to a control as was done in Example 1. The physical properties of the experimental sample and the control are shown in Table II.

TABLE II

| Property | Solution Blend | Control | Improvement |
| --- | --- | --- | --- |
| Tan δ | 0.092 | 0.102 | 10.7% |
| G'50%/G'1% | 0.52 | 0.43 | 21.5% |
| Tensile (mPa) | 20.0 | 20.23 | −1% |
| Elongation | 389% | 400% | −3% |
| M300%/M100% | 5.5 | 4.5 | 22% |
| Power (mKg-m) | 12.4 | 14.4 | 14% |

As can be seen the silica/rubber blend made utilizing the technique of this invention (solution blend) again exhibited significantly better modulus than did the control. It also significantly required less power to formulate in the mixing procedure used.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a silica/rubber blend which consists of (1) dispersing silica, a silica coupling agent, and a low molecular weight end-group functionalized diene rubber throughout a cement of a conventional rubbery polymer wherein the silica, the silica coupling agent, and the low molecular weight end-group functionalized diene rubber are dispersed throughout the cement of the conventional rubbery polymer at a minimum temperature of about 50° C. and a maximum temperature of 130° C., wherein the low molecular weight end-group functionalized diene rubber has a weight average molecular weight which is within the range of 50,000 to 200,000, wherein the low molecular weight end-group functionalized diene rubber is selected from the group consisting of functionalized polybutadiene rubbers and functionalized styrene-butadiene rubbers, wherein the cement of the conventional rubbery polymer is comprised of the conventional rubbery polymer and an organic solvent, and wherein the silica is present at a level which is within the range of 40 phr to 200 phr, and (2) subsequently recovering the silica/rubber blend from the organic solvent.

2. The process as specified in claim 1 wherein the low molecular weight end functionalized diene rubber has a weight average molecular weight that is within the range of about 65,000 to about 150,000.

3. The process as specified in claim 1 wherein the treated silica and the silica coupling agent are dispersed throughout the cement of the rubbery polymer at a minimum temperature of 60° C. and a maximum temperature of 90° C.

4. The process as specified in claim 2 wherein the low molecular weight end-functionalized diene rubber is functionalized with a tetraalkoxysilane.

5. The process as specified in claim 4 wherein the tetraalkoxysilane is tetraethoxysilane.

6. The process as specified in claim 4 wherein the tetraalkoxysilane is tetramethoxysilane.

7. The process as specified in claim 1 wherein the silica is present at a level which is within the range of 50 phr to 150 phr.

8. The process as specified in claim 1 wherein the silica coupling agent is present at a level which is within the range of 2 phr to 20 phr.

9. The process as specified in claim 7 wherein the silica coupling agent is present at a level which is within the range of 3 phr to 15 phr.

10. The process as specified in claim 8 wherein the low molecular weight end-group functionalized diene rubber is present at a level which is within the range of 4 phr to 2phr.

11. The process as specified in claim 9 wherein the low molecular weight end-group functionalized diene rubber is present at a level which is within the range of 5 phr to 15 phr.

12. The process as specified in claim 10 wherein the silica coupling agent is present at a level which is within the range of 4 phr to 8 phr.

13. The process as specified in claim 12 wherein the low molecular weight end-group functionalized diene rubber is present at a level which is within the range of 6phr to 10 phr.

14. The process as specified in claim 2 wherein the low molecular weight end-group functionalized diene rubber is comprised of repeat units that are derived from 1,3-butadiene and styrene.

15. The process as specified in claim 1 wherein the low molecular weight end-group functionalized diene rubber is comprised of repeat units that are derived from 1,3-butadiene.

16. The process as specified in claim 4 wherein the low molecular weight end functionalized diene rubber has a weight average molecular weight that is within the range of about 75,000 to about 125,000.

17. The process as specified in claim 1 wherein the silica is a precipitated silica having a particle size which is within the range of 7 nm to 60 nm.

* * * * *